United States Patent [19]
Dufour et al.

[11] Patent Number: 5,611,727
[45] Date of Patent: Mar. 18, 1997

[54] MIDDLE SPLITTER

[75] Inventors: Yvon Dufour; Jean-Guy Roy, both of St-Anselme; Patrick Fauret, Outremont, all of Canada

[73] Assignee: G.-E. Leblanc Inc., St-Anselme, Canada

[21] Appl. No.: 555,189

[22] Filed: Nov. 8, 1995

[51] Int. Cl.[6] ............................................. A22B 5/20
[52] U.S. Cl. ..................... 452/153; 452/152; 452/160; 83/367
[58] Field of Search ............................... 452/153, 152, 452/160, 149, 151, 155, 163; 83/72, 73, 79, 358, 360, 367

[56] References Cited

U.S. PATENT DOCUMENTS

| | | | |
|---|---|---|---|
| 3,849,836 | 11/1974 | Bernard et al. | 452/151 |
| 4,291,435 | 9/1981 | Hartmann | 452/151 |
| 4,439,891 | 4/1984 | Van Mil | 452/163 |
| 4,756,058 | 7/1988 | Gollnitz et al. | 452/151 |
| 4,868,951 | 9/1989 | Akesson et al. | 452/155 |
| 5,037,349 | 8/1991 | Perreault | 452/153 |
| 5,370,573 | 12/1994 | Warren et al. | 452/152 |
| 5,395,282 | 3/1995 | Harris et al. | 452/149 |
| 5,401,207 | 3/1995 | Hicks et al. | 452/1 |
| 5,421,773 | 6/1995 | Meyer | 452/163 |

Primary Examiner—Willis Little
Attorney, Agent, or Firm—Robic

[57] ABSTRACT

Disclosed is a middle splitter for use in splitting middles of processed animals. This middle splitter has a work table onto which a conveyor belt is mounted. The conveyor belt is slotted along its length. A circular saw extends in the slot of the conveyor belt to cut the middle laid on the conveyor belt as it moves forward. A guide extends parallel to the slot and above the conveyor belt. This guide holds the middle flat against the belt as it is cut. A driving wheel having a vertical axis and peripheral corrugations is driven by a motor to pull the middle towards the saw and push the spine of the middle towards the guide while exerting a pressure to it. The guide includes two proximity switches operatively connected to the pressure-exerting device in such a manner that the pressure exerted by the wheel onto the spine is varied while the middle moves forward. The guide may further include a block located opposite the saw to distance the spine from the saw. The driving wheel is preferably conical, the top part being wider than the bottom part and the bottom part being cylindrical and flat and lying at a predetermined distance above the conveyor belt. This middle splitter is useful for avoiding cutting a portion of the shoulder blade that may be present in the middle.

18 Claims, 4 Drawing Sheets

MIDDLE SPLITTER

BACKGROUND OF THE INVENTION a) Field of the invention

The present invention is concerned with improvements to the meat processing machines called in the trade "middle splitters", which machines are used in the food industry for splitting middles into loins and bellies.

b) Brief description of prior art

In the meat processing industry, it is of common practice to split the carcass of each processed animal along the spine thereof, in order to divide this carcass into two symmetrical parts, called "middles". Usually, such a splitting is carried out after the shoulders and hinds have been removed.

Each middle which is so obtained includes half of the longitudinally splitted spine and the adjacent ribs, loin and belly. In order to obtain various cuts for retail purposes such as chops, ribs and fillets, the middle must then be splitted into a loin and a belly by cutting it parallel to the spine. Such a cutting is made with a machine called "middle splitter".

FIG. 1 identified as prior art, is a perspective view of a middle "M" before it is cut into a loin "L" and a belly "B". The cutting line is shown in dotted line.

Traditionally, middles were split manually with a ribbon saw. The middles were guided through the saw by an operator in order to follow the curved shape of the spine. This method, even though efficient, was labour-intensive.

In order to automate the process and obtain a cut that ultimately respects the curved shape of the spine, middle splitters have been devised. Such machines are devised to straighten the spine before it is split, so that the cutting can be accomplished quickly and efficiently with a circular saw.

After the middle is split, the spine recovers its natural curve. This explains why the dotted line shown in FIG. 1 is not straight. Then, the loin portion "L" that has been cut proceeds to another station in order to be cut into a fillet and chops. The belly "B" also proceeds to another station, where the ribs "R" are lifted out. In the case of pork, the remaining belly meat is used to make bacon by first smoking the meat and then slicing it into thin slices using a ribbon saw.

As aforesaid, middle splitters are already used in the industry. They basically comprise a work table onto which a slotted conveyor belt is mounted to move the carcass in a forward direction with the shoulder-adjacent end of the middle positioned forwardly. A circular saw substantially perpendicular to the conveyor belt, extends into the slot provided in the conveyor belt. This saw is positioned in such a manner as to cut the middle laid on the conveyor belt at a distance of 2 inches from the spine of the middle when the middle moves forwards. The middle splitter also includes a guide, parallel to the slot, slightly above the conveyor belt, to hold the middle fiat against the conveyor belt while it is cut by the saw.

A driving wheel having peripheral corrugations to engage the middle adjacent the spine, is rotatably mounted near the circular saw to pull the middle toward the circular saw while pushing the spine toward the adjacent guide. This driving wheel which is preferably conical in shape, is powered by a motor. The wheel exerts pressure on the spine by way of pressure-exerting means devised to push the wheel towards the guide to straighten the spine while the middle is cut so that a straight cut may be obtained. After the middle is split, the spine recovers its natural shape. The resulting cut is in practice equivalent to the one an operator would have obtained by manually splitting the middle with a ribbon saw, but with far greater efficiency.

So far, the driving wheel which, as aforesaid, is preferably conical, has a top diameter of approximately 22 inches and a bottom diameter of 16 inches. The bottom part is cylindrical and extends 2 inches towards the conveyor belt, just slightly above it.

If the middle splitters presently in use are efficient, there are still some problems associated with their use.

Removal of the shoulder from the middle is made by cutting. During such operation a portion "P" of the shoulder blade is often cut and remains in the middle, as shown in FIG. 1. When the middle subsequently proceeds through the middle splitter, the driving wheel which applies a constant pressure to the spine to straighten it also pushes on the portion of the shoulder blade that was left in the loin. Such causes this shoulder blade portion to be cut, and part of it to remain in the belly. When the bacon is sliced, this part of the shoulder-bone may snap the ribbon saw when it encounters it. Such slows down the process and is rather costly, as the ribbon saw must often be replaced.

Another problem associated with the existing middle splitter is that the guide, which is parallel to the slot, makes the entry of the middle into the splitter difficult. Furthermore, as the guide is rigidly mounted on the machine at a given distance from the conveyor belt, it does not allow for middles of different sizes and thicknesses to be easily processed. Thus larger middles will proceed through the splitter with greater difficulty as the guide cannot be adjusted.

SUMMARY OF THE INVENTION

It is a first object of the invention to provide an improved middle splitter that does not cut the portion of the shoulder blade that may be left in the loin.

in accordance with the invention, this first object is achieved with a middle splitter of the type mentioned above, where the guide further includes two proximity switches that are operatively connected to the pressure-exerting means that push the driving wheel in such a manner as to vary the pressure exerted onto the spine as the middle moves forward relative to the saw. The first switch sends a signal to the pressure-exerting means to apply a smaller pressure when the middle starts engaging the saw and the second switch sends another signal to apply a greater pressure when the middle further moves past the saw. This avoids pushing the part of the shoulder blade that may be left in the middle towards the saw and thus having it cut.

In accordance with a preferred embodiment of the invention, this first object may further be achieved with a middle splitter of the type mentioned above where the guide further includes a block located on the opposite side of the saw, near the saw. This block distances the spine from the saw. As a result, the part of the shoulder blade that is left in the middle will not be cut by the saw.

In accordance with another preferred embodiment of the invention, the first object mentioned above may further be achieved with a middle splitter of the type mentioned above where bottom part of the driving wheel lies at least one (1) inch above the conveyor belt and has a top part diameter of at least thirty (30) inches and a bottom part diameter of at least twenty-four (24) inches. This reduces the pressure exerted on the spine when it proceeds through the middle splitter and applies a more constant pressure, again to avoid cutting the part of the shoulder blade that may be left in the middle.

A second object of the invention is to provide an improved middle splitter of the above mentioned type that also eases entry of the middle into the machine.

In accordance with the invention, this second object is achieved with a middle splitter of the type mentioned above, where the guide is at an angle with respect of the slot of the conveyor belt.

A third object of the invention is to provide an improved middle splitter of the above mentioned type that allows for middles of different sizes and thicknesses to be easily processed.

In accordance with the invention, this third object is achieved with a middle splitter of the type mentioned above, where the guide is supported by resilient means which allows the guide to move in a vertical manner when middles of different sizes are engaged.

BRIEF DESCRIPTION OF THE DRAWINGS

The structure, operation and other advantages will be better understood upon reading the following non-restrictive description of a preferred embodiment thereof, given with reference to the accompanying drawings, in which.

DESCRIPTION OF A PREFERRED EMBODIMENT

Figure 1:
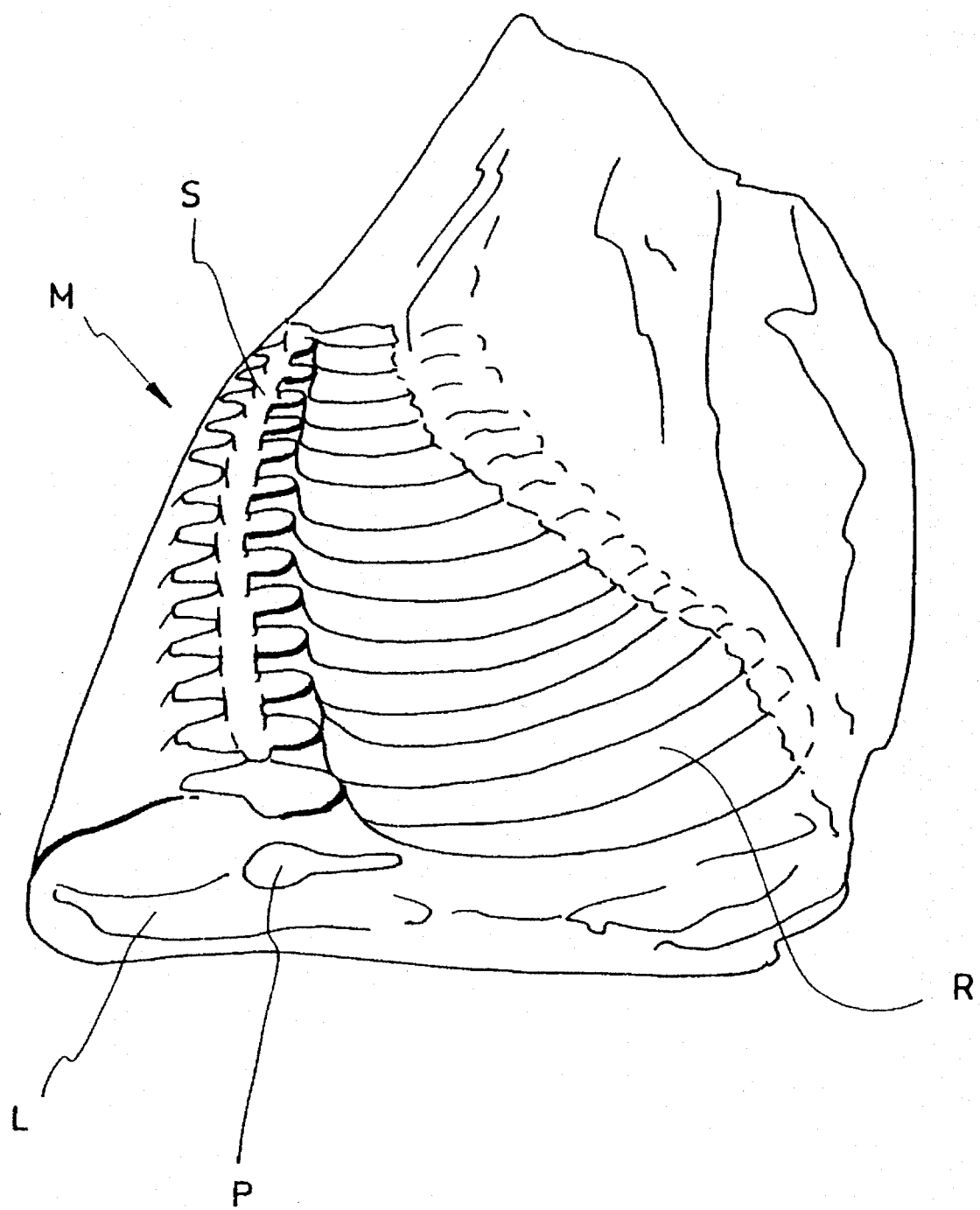
FIG. 1 is a perspective view of a middle.
Figure 2:
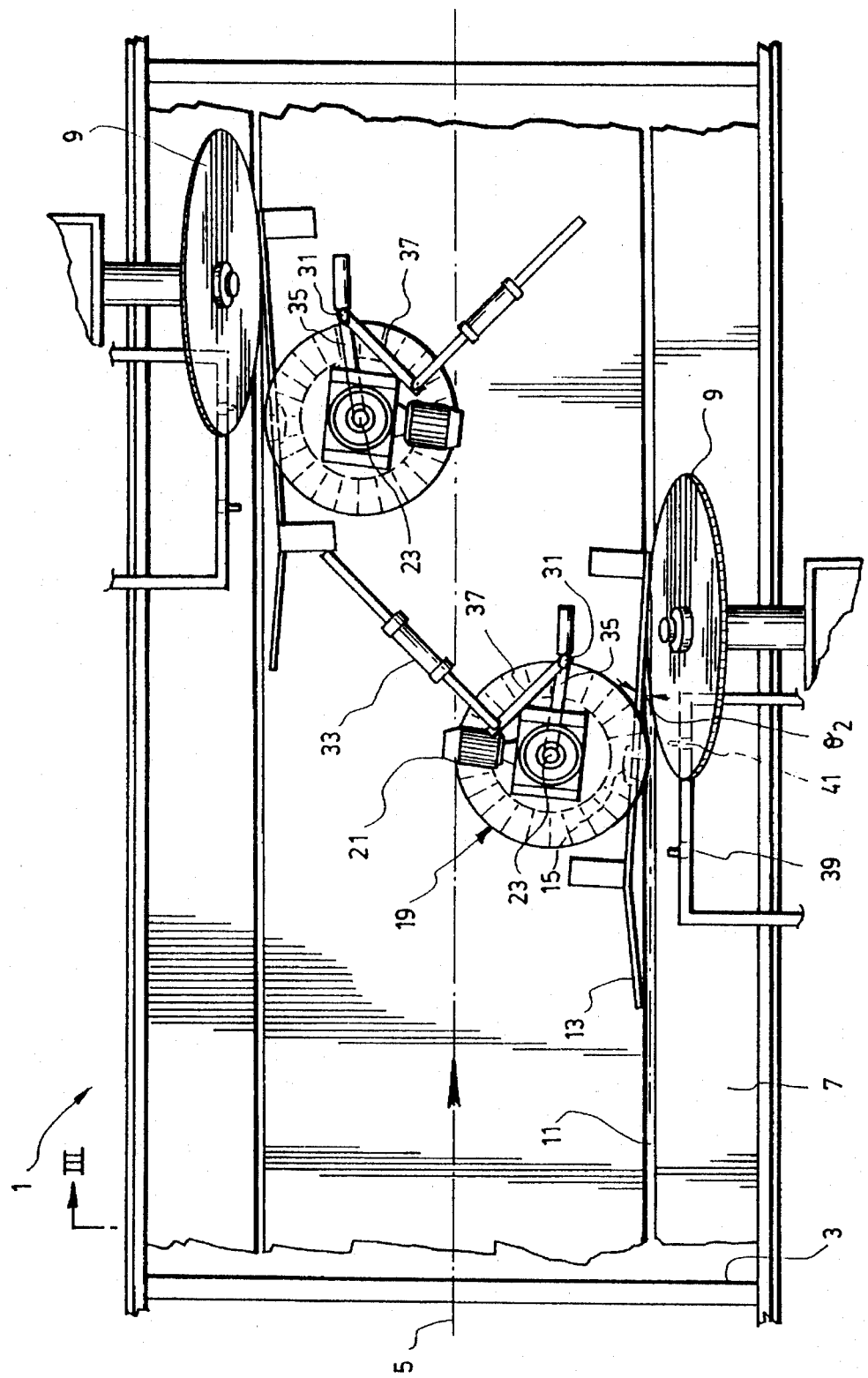
FIG. 2 is a top plan view of an improved middle splitter.
Figure 3:
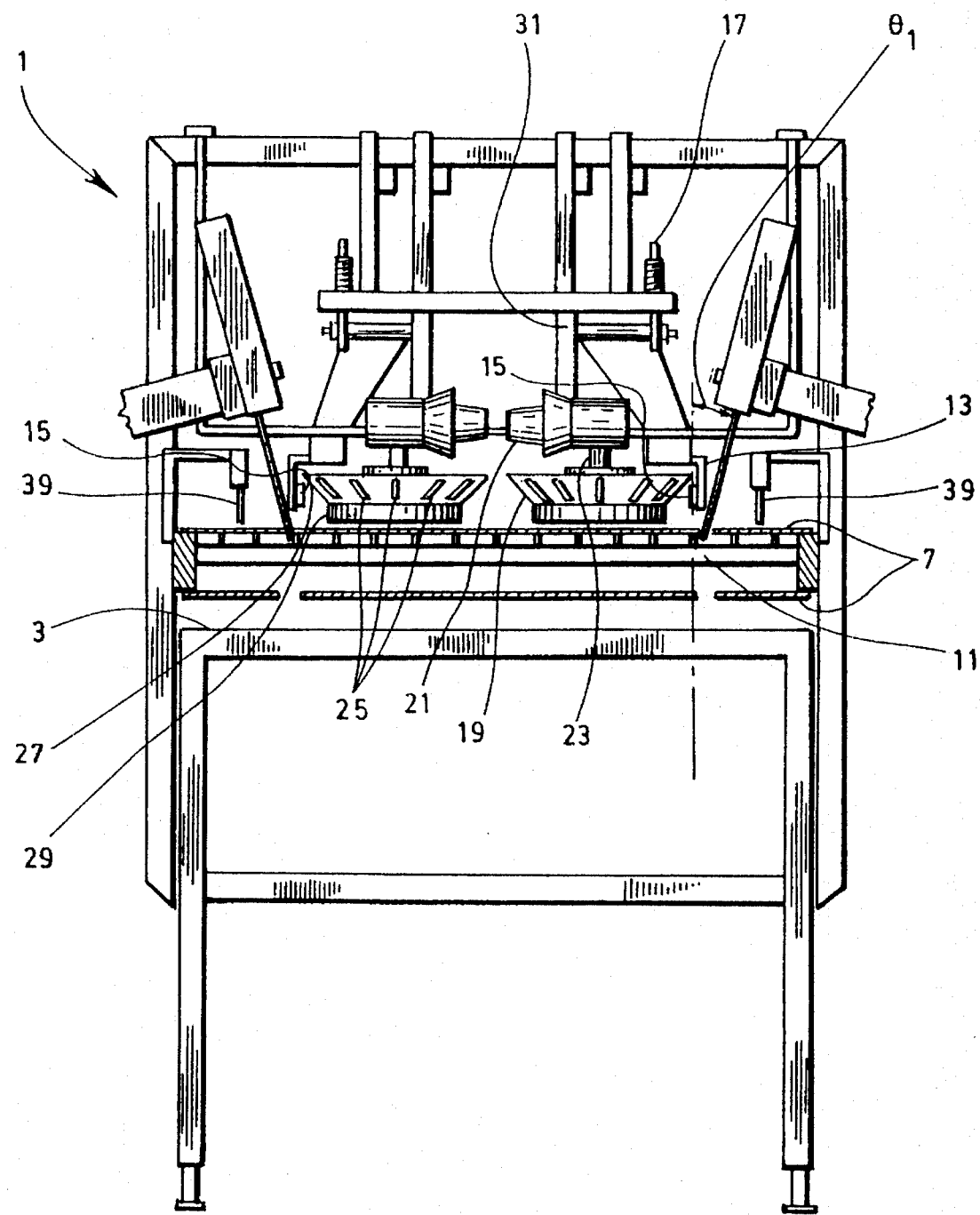
FIG. 3 is a front elevational view of the same improved middle splitter.
Figure 4:
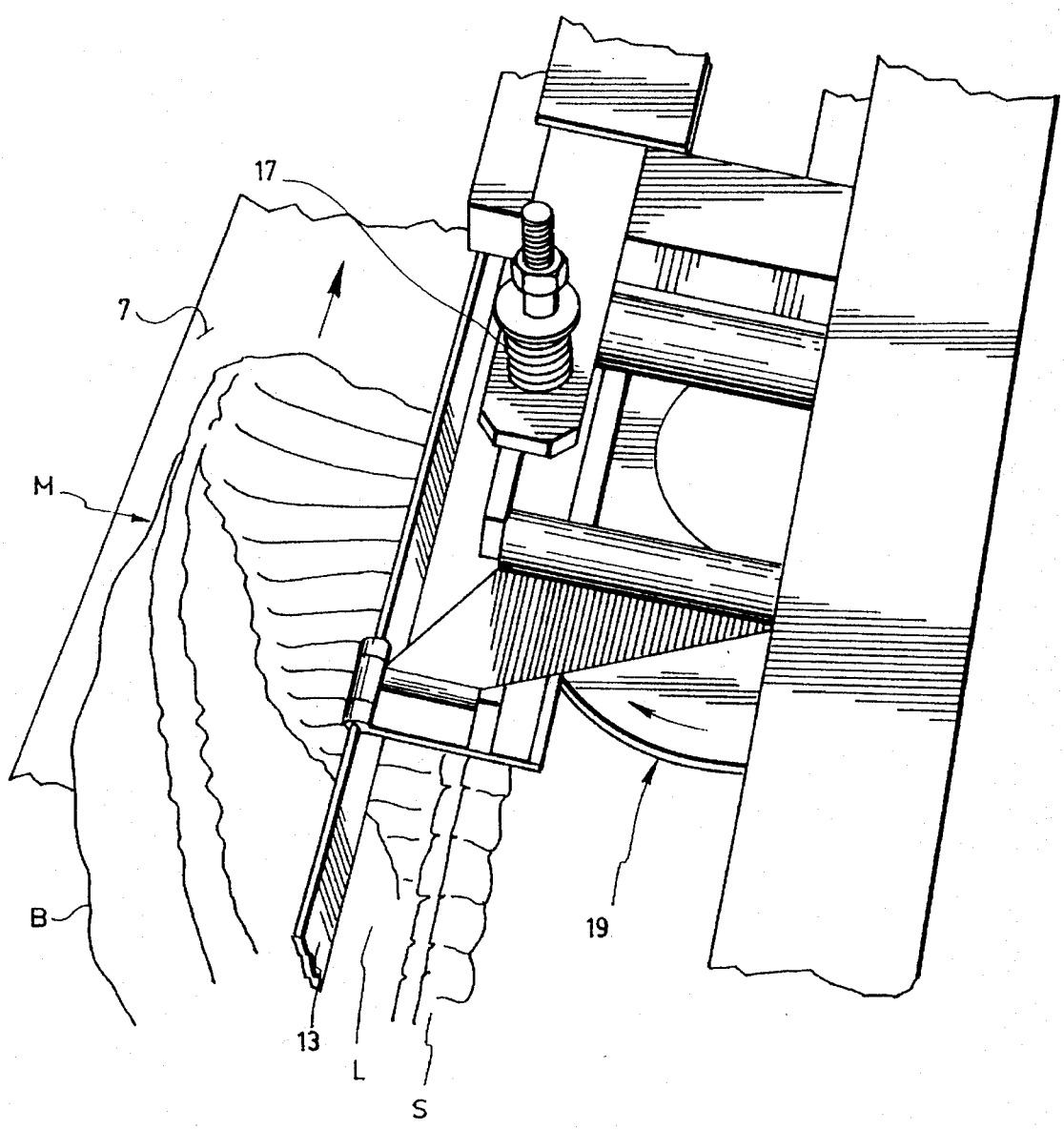
FIG. 4 is a top perspective view of the central part of the improved middle splitter in use.

As aforesaid, FIG. 1 shows a middle M having a loin portion L, a belly portion B and a portion P of the shoulder blade that may remain in the middle M when the same is splitted along the spine S to separate the loin portion L from the belly portion B. It can be understood that, because of the animal's morphology, there are two kinds of middles, viz. right-hand side middles and left-hand side middles.

The middle splitter 1 according to the invention is a machine intended to be used for splitting the above-described middles into loins L and bellies B. More particularly, this machine is devised to process both kinds of middles and split each of them into a loin and a belly.

Basically, the middle splitter 1 comprises a work table 3 having a longitudinal axis 5. It also comprises a conveyor belt 7 having a longitudinal slot 11 which extends over the work table 3 to move the middles M fed on it in a forward motion with the shoulder-adjacent ends of the middles M positioned forwardly.

On top of the work table, processing means are mounted to split the right-hand side and left-hand side middles, respectively. Because such processing means are mirror copies of each other and work in the same way, only one of them will be described in further detail hereinafter.

Each processing means comprises a circular saw 9, preferably having a diameter of thirty-six (36) inches, which is mounted onto the work table 3. This saw 9 lies in a plane substantially perpendicular to the conveyor belt 7 and parallel to the longitudinal axis 5. It extends in the slot 11 and is positioned to cut the corresponding middles M laid on the conveyor belt as they move forward. The saw is at an angle $\Theta_1$ with respect to the plane perpendicular to the conveyor belt 7. Angle $\Theta_1$ is preferably equal to about 15° even though it could be varied according to the user's specifications.

A guide 13 extends in a plane parallel to the longitudinal axis 5, slightly above the conveyor belt 7 to hold the middle M flat against the conveyor belt 7 as the middle M is cut by the saw 9. Advantageously, the guide 13 is biased downwards by a spring 17, which allows the guide 13 to move vertically when middles M of different thicknesses are engaged in the middle splitter 1. This eases the process, as larger middles will proceed with greater facility through the machine.

A driving wheel 19 extends in a plane parallel to the conveyor belt 7 near the circular saw 9. The wheel 19 is driven by a motor 21 and is rotatably mounted on a shaft 23 perpendicular to the conveyor belt 7. The wheel 19 has peripheral corrugations 25 to engage the middle M adjacent the spine S, pull the middle M toward the circular saw 9 and push the spine S against the guide 13.

The driving wheel 19 is conical in shape and has a top part 27 and a bottom part 29. Preferably, the top part 27 has a diameter of at least thirty (30) inches. Preferably also, the bottom part 29 has a diameter of at least twenty-four (24) inches and extends three and a half (3½) inches below the top part. This bottom part 29 is cylindrical with a flat bottom face and preferably has a thickness of one (1)inch.

Pressure is exerted on the spine of a pressure-exerting means preferably consisting of a shaft 31 and a cylinder 33 which is preferably hydraulic even though it could also be pneumatic. The shaft 31 has two arms 35, 37, one projecting from the bottom part of the shaft, the other projecting from the top part of the shaft. The driving wheel shaft 23 is fastened to the bottom arm 35. Alternatively, the motor can be directly fastened to the arm. A hydraulic cylinder 33 is fastened to the top arm 37, so that when the cylinder 33 expands or contracts, the driving wheel 19 moves radially about the central axis of the second shaft 31. This applies pressure to the middle M as it proceeds through the middle splitter 1, and allows for middles of different sizes to proceed with ease.

In accordance with a first aspect of the invention, two proximity switches 39, 41 are adjustably mounted upstream of the circular saw 9 to detect the presence of a middle moving forward on the conveyor. The switches 39, 41 are operatively connected to the cylinder 33, in order to vary the pressure exerted on the spine S while the middle M moves forward.

The first switch 39 sends a signal to the cylinder 33 to apply a smaller pressure to the middle M when it starts engaging the saw. The second switch 41 sends another signal to the cylinder 33 to apply a greater pressure to the middle M as it further moves past the saw 9. Thus, any portion P of the animal's shoulder blade that would remain in the middle M will not be pushed towards the circular saw 9 while the shoulder-adjacent end of the middle M is cut, as the greater pressure will be applied to the middle M in order to straighten the spine S only when the shoulder-adjacent end in which a portion P of the shoulder blade may be present has been cut.

In practice, the linear speed of the conveyor belt 7 and the rotation of the driving wheel 19 should be adjusted with a frequency adjuster, as the driving wheel 19 must rotate at the same speed as the conveyor belt 9. As can be understood, the distance from the proximity switches 39, 41 and the circular saw 9 should also be proportionally adjusted when the linear speed is adjusted, to allow for a time lag between the signal sent by each of the proximity switches 39, 41 and the reaction of the cylinder 33.

In accordance with another aspect of the invention, the guide preferably includes a block 15, located adjacent the saw 9 but on the opposite side. The purpose of this block is to distance the spine S from the saw 9 while it moves past the saw, and thus to further reduce the risk of having the portion B of the shoulder cut by the saw.

In accordance with a further aspect of the invention, the bottom part 29 of the driving wheel 19 is preferably located at a minimal distance from the conveyor belt. More particularly, such bottom part 29 is preferably extending at least one (1) inch above the conveyor belt 7. Thus, when the middle M is engaged, the large wheel 19 will apply a more constant pressure to the middle M as it is cut. Furthermore, since the bottom part 29 is not adjacent to the conveyor belt 7, it will avoid putting extra pressure on the lower part of the spine S, so that the portion P of the shoulder blade that may be present in the middle M will not be pushed toward the saw 9 and therefore not cut.

Preferably also, the guide 13 is positioned at an angle $\Theta_2$ with respect to the longitudinal axis 5 to facilitate entry of the middle M into the middle splitter 1.

Although the present invention has been explained hereinabove by way of a preferred embodiment thereof, it should be pointed out that any modifications to this preferred embodiment within the scope of the appended claims is not deemed to alter or change the nature and scope of the present invention.

We claim:

1. In a machine hereinafter called "middle splitter" for use to process one half of a carcass of an animal, hereinafter called "middle", in such a manner as to split said middle into two parts, said middle having a shoulder-adjacent end and including half of the animal's spine, said middle splitter comprising:

a work table having a longitudinal axis a conveyor belt extending over said work table to move said carcass longitudinally in a forward motion with the shoulder-adjacent end of said middle positioned forwardly, said conveyor belt being longitudinally slotted;

a circular saw lying in a plane substantially perpendicular to the conveyor belt and parallel to said longitudinal axis, said saw extending in the slot of the conveyor belt and being positioned in such a manner as to cut the middle laid on said conveyor belt when said middle moves forwards;

a guide extending in a plane parallel to said longitudinal axis slightly above the conveyor belt to hold the middle flat against said conveyor belt while said middle is cut by said saw;

a driving wheel extending in a plane parallel to the conveyor belt near the circular saw, said wheel being rotatably mounted on a shaft perpendicular to said conveyor belt and having peripheral corrugations to engage the middle adjacent the spine that is part thereof, said wheel then pulling said middle toward the circular saw and pushing the spine toward the adjacent guide;

a motor for driving said wheel into rotation; and pressure-exerting means for pushing the wheel towards the guide in a direction transverse to said longitudinal axis so that said wheel exerts a pressure onto the spine to straighten it up while the middle is cut;

the improvement comprising:

first and second proximity switches mounted at a given distance upstream of the circular saw, said switches being operatively connected to said pressure-exerting means in such a manner as to vary the pressure exerted onto the spine while the middle moves forward relative to the saw, the first switch sending a signal to said pressure exerting means to apply a smaller pressure to said middle when the same starts engaging the saw, the second switch sending another signal to said pressure-exerting means to apply a greater pressure to the middle while said middle further moves past the saw, whereby, in use, any part of the animal's shoulder blade that would inadvertently remain in the middle will not be pushed towards the circular saw while the shoulder-adjacent end of the middle is cut as said greater pressure will be applied to the middle in order to straighten the spine only when said shoulder-adjacent end in which said part of the animal's shoulder blade may be present has been cut.

2. A machine according to claim 1 wherein said guide further comprises a block located on the side opposite said saw, adjacent said saw to distance the spine from said saw.

3. A machine according to claim 1 wherein said driving wheel is conical and comprises a top and bottom parts, said top part being wider than said bottom part, wherein said bottom part is cylindrical, is flat and lies at least one (1) inch above said conveyor belt.

4. A machine according to claim 3 wherein said driving wheel has a top part diameter of at least thirty (30) inches and a bottom part diameter of at least twenty-four (24) inches.

5. A machine according to claim 1 wherein said pressure exerting means comprises:

a second shaft having a top and bottom part and a central axis, said central axis lying in a plane perpendicular to said longitudinal axis, said second shaft being able to pivot about said central axis;

a first arm rigidly projecting from the bottom part of said shaft, said first arm extending in a plane substantially parallel to said conveyor, where said driving wheel shaft is fastened to said arm;

a second arm rigidly projecting from the top part of said second shaft, said second arm extending in a plane substantially parallel to said conveyor; and pivoting means to pivot said shaft, said pivoting means being fastened to the second arm of said shaft;

whereby when said pivoting means pivots said shaft, said driving wheel moves radially about said central axis towards the guide.

6. A machine according to claim 5 wherein said pivoting means is a hydraulic cylinder.

7. A machine according to claim 1 wherein said guide is at an angle with respect to said longitudinal axis.

8. A machine according to claim 1 wherein said guide is supported by resilient means allowing said guide to move in a vertical manner when middles of different thickness are engaged in the machine.

9. A machine according to claim 1, further comprising:

means to vary the speed of said conveyor belt; and means to adjust the distance between said proximity switches and said circular saw, whereby when said conveyor belt speed is varied, said distance between said proximity switches and said circular saw may be is adjusted proportionally to account for a time lag between the signal sent by each of the proximity switches and the reaction of said pressure exerting means.

10. A machine according to claim 3 wherein said guide further comprises a block located on the side opposite said saw, adjacent said saw, to distance the spine from said saw.

11. A machine according to claim 10 wherein said pressure exerting means comprises:

a shaft having a top and bottom part and a central axis, said central axis lying in a plane perpendicular to said longitudinal axis said shaft being able to pivot about said central axis said driving wheel is fastened;

an arm rigidly projecting from the bottom part of said shaft, said arm extending in a plane substantially parallel to said conveyor; and pivoting means to pivot said shaft, said projecting means being fastened to the top part of said shaft whereby when said means pivots said shaft, said driving wheel moves radially about said central axis towards the guide.

12. A machine according to claim 11 wherein said guide is supported by a resilient means allowing said guide to move in a vertical manner when middles of different thickness are engaged in the machine.

13. A machine according to claim 12 wherein said guide is at an angle with respect to said longitudinal axis.

14. A machine according to claim 13, further comprising:

means to vary the speed of said conveyor belt; and means to adjust the distance between said proximity switches and said circular saw, whereby when said conveyor belt speed is varied, said distance between said proximity switches and said circular saw may be adjusted proportionally to account for a time lag between the signal sent by each of the proximity switches and the reaction of said pressure exerting means.

15. A machine according to claim 3 wherein said pressure exerting means comprises:

a shaft having a top and bottom part and a central axis, said central axis lying in a plane perpendicular to said longitudinal axis said shaft being able to pivot about said central axis said driving wheel is fastened;

an arm rigidly projecting from the bottom part of said shaft, said arm extending in a plane substantially parallel to said conveyor; and pivoting means to pivot said shaft, said pivoting means being fastened to the top part of said shaft whereby when said means pivots said shaft, said driving wheel moves radially about said central axis towards the guide.

16. A machine according to claim 3 wherein said guide is at an angle with respect to said longitudinal axis.

17. A machine according to claim 3 wherein said guide is supported by a resilient means allowing said guide to move in a vertical manner when middles of different thickness are engaged in the machine.

18. A machine according to claim 3, further comprising:

means to vary the speed of said conveyor belt; and means to adjust the distance between said proximity switches and said circular saw, whereby when said conveyor belt speed is varied, said distance between said proximity switches and said circular saw may be adjusted proportionally to account for a time lag between the signal sent by each of the proximity switches and the reaction of said pressure exerting means.

* * * * *